April 9, 1968 C. LANZA 3,377,566

VOLTAGE CONTROLLED VARIABLE FREQUENCY GUNN-EFFECT OSCILLATOR

Filed Jan. 13, 1967

INVENTOR
CONRAD LANZA

BY S. P. Tedesco
ATTORNEY 3,377,566

VOLTAGE CONTROLLED VARIABLE FREQUENCY GUNN-EFFECT OSCILLATOR

Conrad Lanza, Putnam Valley, N.Y., assignor to International Business Machines Corporation, Armonk, N.Y., a corporation of New York Filed Jan. 13, 1967, Ser. No. 609,031
16 Claims. (Cl. 331—107)

ABSTRACT OF THE DISCLOSURE

A microwave oscillator comprising a specimen of multivalley semiconductor material and electric field applying means including a voltage source connected to ohmic contacts of concentric geometry attached at one surface of the specimen. The semiconductor material has the innate property of being responsive to electric fields in excess of a critical intensity $E_T$ to cause a redistribution of electric fields so as to nucleate a high electric field region, or domain, and responsive to electric fields in excess of a sustaining intensity $E_S$, where $E_S<E_T$, to propagate such high electric field region. Due to the concentric geometry of the ohmic contacts, a field sustaining point $X_S$ whereat the electric field intensity is less than a sustaining intensity $E_S$ is defined along an intermediate portion of the specimen. High electric field regions are nucleated and propagated in cyclic fashion such that current through the specimen varies periodically in time in the form of coherent oscillations. The location of the field sustaining point $X_S$ and, therefore, the frequency of the coherent oscillations in the specimen is continuously controlled by the voltage applied across the ohmic contacts.

*Background of the invention*

This invention relates to microwave oscillators and, more particularly to microwave oscillators of the "Gunn-effect" type wherein the frequency of coherent oscillations is independent of the length of specimen of multivalley semiconductor material and is essentially determined by the magnitude of voltage applied across such specimen.

"Gunn-effect" devices, or oscillators, have attracted widespread attention as they provide a cheap and efficient source of microwave oscillations. Heretofore, microwave oscillator arrangements have required expensive and complex devices, e.g., klystron, magnetrons, traveling wave tubes, etc., which are not only expensive, but, also, bulky, so as to be impractical for many present day applications. "Gunn-effect" devices present numerous advantages over prior art devices due to their very small size and low cost. Essentially, a "Gunn-effect" device comprises a small specimen of particular semiconductor material, i.e., having an active length of the order of $2\times10^{-3}$ cm., which generates and sustains current oscillations in the microwave range when subjected to electric fields in excess of a critical intensity $E_T$. According to present theory, a high electric field region, or domain, is formed within the specimen when subjected to electric fields in excess of a critical intensity $E_T$; the high electric field region is sustained and propagated along the specimen by electric fields greater than a sustaining intensity $E_S$. When a constant voltage of sufficient magnitude is applied across the specimen, high electric field regions are nucleated and propagated in successive, or cyclic, fashion whereby current through the specimen varies periodically to generate coherent oscillations. Prior art "Gunn-effect" devices have been generally formed of specimens having a uniform cross section and doping profile such that the low electric field region, as distinguished from the high electric field region being propagated, is of uniform intensity and, at least, in excess of the sustaining intensity $E_S$. The theory of the "Gunn-effect" has been described in "Theory of Negative-Conductance Amplification and of Gunn Instabilities in 'Two-Valley' Semiconductors" by D. E. McCumber et al., IEEE Transactions on Electron Devices, vol. ED-13, No. 1, January 1966.

The frequency of coherent oscillations generated by "Gunn-effect" devices, operated in the traveling domain mode depends primarily on the propagation distance and propagation velocity of the high electric field regions along the specimen. Accordingly, the frequency of coherent oscillations is given by the expression $l/v$ where $v$ is the propagation velocity and $l$ is the propagation distance of the high electric field region. The propagation velocity of a high electric field region along the specimen is a constant, e.g. approximately $10^7$ cm./sec. in n-type gallium arsenide. The ability to produce coherent oscillations of a predetermined frequency is not easily attained since precise tailoring of the specimen length is required. To avoid this dependence of frequency on specimen lengths prior art techniques include the use of resonant cavities, the nucleation of high electric field regions along an intermediate portion of the specimen, for example, by auxiliary electrodes and, also, by varying the impurity-cross section product of the specimen as described in the J. B. Gunn patent application Ser. No. 374,758, filed on June 12, 1964, and entitled, "Electric Field-Responsive Solid State Device."

Such techniques, however, provide a fixed device structure capable of generating only a particular frequency of coherent oscillations. One limitation of "Gunn-effect" devices has been the inability to vary continuously and rapidly the frequency of coherent oscillations since fixed by device geometry or cavity tuning. The ability to control, or vary continuously and rapidly, the frequency of coherent oscillations would open up numerous additional uses of "Gunn-effect" devices, e.g., as modulators, etc.

Accordingly, an object of this invention, therefore, is to provide a solid state device of the "Gunn-effect" type having a controllable frequency of oscillation which does not require changes in device geometry or cavity tuning.

Another object of this invention is to provide a solid state device of the "Gunn-effect" type wherein the frequency of coherent oscillations is readily and rapidly controlled.

Another object of this invention is to provide a solid state device of the "Gunn-effect" type having a novel electrode structure.

*Summary of the invention*

These and other objects and advantages of this invention are achieved by forming the device structure such that an electric field gradient is established along the specimen during equilibrium conditions, i.e., during the absence of a high electric field region, whereby electric field intensity in the specimen is greatest adjacent one of the electrodes. As the applied voltage is increased, the electric fields intensity along a portion of the specimen adjacent the one electrode first exceeds the critical intensity $E_T$ to nucleate a high electric field region; the electric field intensity along a portion of the specimen adjacent the other electrode is less than the sustaining intensity $E_S$. By varying the magnitude of voltage applied across the specimen, the propagation distance of the high electric field region and, hence, the frequency of coherent oscillations is controlled.

In accordance with the more particular aspects of this invention, frequency control independent of the device structure is obtained in a case of a uniformly doped specimen of constant cross section by forming the electrodes, or ohmic contacts, in a concentric or "ring-dot," geometry on a same major surface of the specimen. For example, such specimen can be an epitaxially grown layer of particular n-type semiconductor material formed on a semi-insulating or p-type semiconductor substrate; the semiconductor is preferably thin so as to minimize power consumption. Due to the particular electrode geometry, the intensity of electric fields within the specimen is not uniform, but, rather, is maximum at edge of the "dot" electrode, or cathode, and reduces by a factor $l/r$ between the electrodes, where $r$ is the distance from the center of the "dot" electrode. Accordingly, a high electric field region of annular shape is nucleated at and propagates from the "dot" electrode, or cathode, toward the "ring" electrode, or anode. The high electric field region does not necessarily propagate to the anode before it is extinguished but, rather, only along portions of the specimen wherein the electric field intensity is in excess of the sustaining intensity $E_S$. Due to the electric field distribution within the specimen, the intensity of the electric fields falls below the sustaining intensity $E_S$ at the field sustaining point $X_S$ which is determined by the magnitude of the applied voltage. Alternatively, a similar operation is obtained by doping the specimen in graded fashion so as to establish an electric field gradient during equilibrium conditions. When specimens have graded impurity profiles, electrodes are attached to opposite surfaces of the specimen and can be conventional, or similar, geometry.

*Description of preferred embodiments*

Figures 1A, 1B:
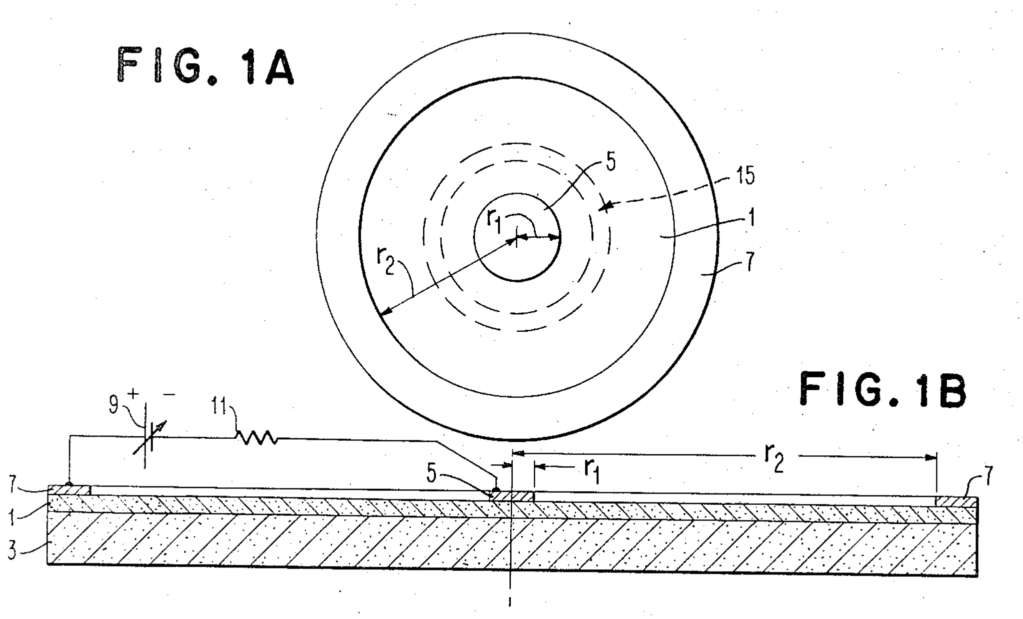
FIGS. 1A and 1B are top and cross-sectional views, respectively, of a solid state device in accordance with the invention which illustrate the "ring-dot" geometry of the cathode and anode electrodes.

Referring to FIGS. 1A and 1B, a microwave oscillator in accordance with this invention comprises an n-type gallium arsenide layer 1 formed epitaxially over a substrate 3 of intrinsic gallium arsenide materials. Layer 1 can be formed of other semiconductor material, for example, n-type indium phosphide, n-type cadmium telluride, n-type indium arsenide when pressured, n-type zinc selenide, etc., which have suitable multivalley conduction bands and are capable of nucleating and propagating a high electric field region as hereinafter described. Ohmic electrodes 5 and 7 are formed over the upper major surface of layer 1 in "ring-dot" fashion. More particularly, electrode 5 is formed as a disc having a radius $r_1$; electrode 7 is formed as an annular or a sheet having a radius $r_2$ and concentric with electrode 5. Electrodes 5 and 7 can be formed, for example, by conventional alloying techniques or by N+ material, either diffused or vapor grown. Variable voltage source 9 and load 11 are connected between electrodes 5 and 7. If desired, voltage source 9 can be operated in pulsed fashion.

Figure 2A:
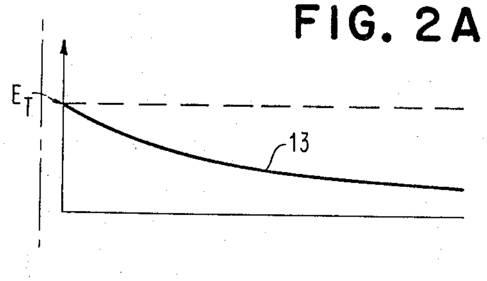
FIGS. 2A and 2B are curves which illustrate the electric field distribution within the specimen of semiconductor material during equilibrium and non-equilibrium operation, respectively.
Figure 2B:
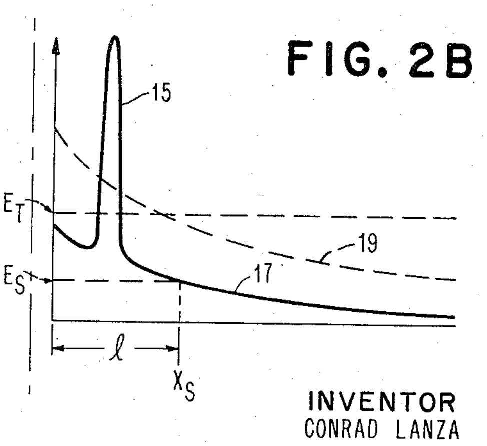

The voltage applied by source 9 across electrodes 5 and 7 produces an electric field distribution, or gradient, along layer 1 as shown by curve 13 in FIG. 2A. When layer 1 is subjected to electric fields in excess of a critical intensity $E_T$, electric fields within layer 1 are redistributed due to a change in carrier mobility so as to define a high field region 15, or domain, as shown by curve 17 in FIG. 2B. High electric field region 15 is nucleated due to a transfer of carriers from the low-energy/high-mobility valley to a higher-energy/lower-mobility valley in the conduction band of layer 1. The presence of a high electric field region 15 in layer 1 reduces current flow therealong and load 11 because a large portion of the applied voltage is dropped across the higher resistivity exhibited by the high electric field region. Since high electric field regions 15 are nucleated and extinguished in layer 1 in cyclic fashion, current through load 11 is periodically modulated in the form of microwave oscillations.

For example, as the voltage across electrodes 5 and 7 is varied from zero-volts, current along layer 1 and load 11 increases substantially linearly in accordance with Ohm's law. As shown by curve 13 in FIG. 2A, the applied voltage is of sufficient magnitude to establish an electric gradient in layer 1 having a maximum intensity at the periphery of electrode 5 just below the critical intensity $E_T$. The particular geometry of electrodes 5 and 7 insures that the electric field intensity in layer 1 first exceeds the critical intensity $E_T$ adjacent to electrode 5, or cathode, such that the high electric field region 15 is nucleated thereat. Accordingly, the effects of any impurities, or nonuniformity, along portions of layer 1 which could increase the impurity-cross section product sufficiently to nucleate a high electric field region are avoided. The intensity of electric fields along layer 1 falls off as $l/r$ between electrodes 5 and 7, where $r$ is the distance measured from the center of electrode 5. A further increase in voltage applied across electrodes 5 and 7 would normally produce an electric field distribution in layer 1 illustrated by curve 19 of FIG. 2B. However, due to the innate properties of the semi-conductor material, carriers along layer 1 adjacent the edge of electrode 5 are subjected to electric fields in excess of the critical intensity $E_T$ and are transferred from a high-mobility valley to a lower-mobility valley in the conduction band. When transferred to the lower-mobility valley, the effective mass of the carriers is increased such that the carriers exhibit an abrupt decrease in mobility. Accordingly, a bunching of carriers of different mobility occurs adjacent electrode 5 such that electric fields within layer 1 are redistributed so as to define a high electric field region 15; the electric field intensity within remaining portions of layer 1 are correspondingly reduced as illustrated by curve 17 in FIG. 2B. The high electric field region 15 is sustained and propagated in the direction of carrier flow while subjected to electric fields in excess of a sustaining intensity $E_S$. The intensity of electrc fields at a point within layer 1 between $r_1$ and $r_2$ is given by the expression $E(r)=V/r\ \ln(r_2/r_1)$.

Accordingly, high electric field region 15 is propagated along layer 1 until it reaches sustaining field point $X_S$ whereat the electric field intensity is below the sustaining intensity $E_S$ and is extinguished. When a high electric field region 15 is extinguished, the normal electric field gradient illustrated by curve 19 in FIG. 2B tends to be reestablished whereupon the intensity of electric field in layer 1 adjacent to the edge of electrode 5 rises in excess of the critical intensity $E_T$ and a next high electric field region 15 is nucleated and propagated. Accordingly, a time-varying field effect is produced in layer 1 which varies periodically in time the current flow in load L in the form of coherent oscillations in the microwave frequency range having a frequency determined by the propagation distance $l$, or the location of the sustaining field point $X_S$, along layer 1. The geometry of electrodes 5 and 7, provide that the frequency of the coherent oscillations can be controlled continuously by varying the magnitude of the applied voltage V so as to locate the sustaining field point $X_S$ along the length of layer 1 intermediate electrodes 5 and 7. Also, it is evident that the spacing between electrodes 5 and 7 and the magnitude of the applied voltage V can be determined such that a high field region 15 is propagated to electrode 7 before it is extinguished.

Also, the structures shown are advantageous in increasing the power efficiency so as to minimize self-heating since the input power requirements vary as the square of the radius $r_1$ of electrode 5 and is relatively independent of the radius $r_2$ of electrode 7. For example, when the thickness of layer 1 is much less than the radius $r_2$ of electrode 7, power input required to establish the critical field intensity $E_T$ is given by the expression $$P\ (\text{in}) = \frac{2\pi t}{\rho} E_T^2 r_1^2 \ln \frac{r_2}{r_1}$$

where $\rho$ is the resistivity of the semiconductor material forming layer 1. Accordingly, reducing the radius $r_1$ of electrode 5 reduces power input.

Figure 3A:
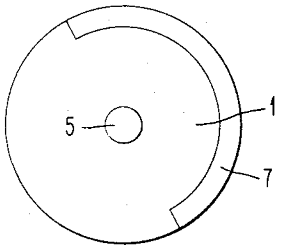
FIGS. 3A and 3B illustrate top and cross-sectional views, respectively, of additional solid state device structures in accordance with the invention.
Figure 3B:
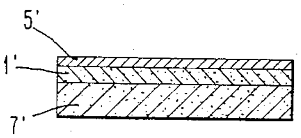

It should be understood that the results of this invention can be achieved in other device structures wherein an electric field gradient as shown by curve 13 in FIG. 2A is normally produced in the semiconductor specimon. As illustrated in FIG. 3A, electrode 5 can be formed in circular geometry over layer 1 whereas electrode 7 can be shaped as a segment of an annulus. Further, as shown in FIG. 3B, such electric field gradient can be obtained by doping a specimen 1' in graded fashion and forming electrodes 5' and 7' on opposing surfaces. For example, layer 1 of n-type gallium arsenide can be epitaxially disposed over n++-type gallium arsenide substrate 7' the doping concentration being continuously reduced during the deposition process; subsequently a metallic ohmic electrode is formed over layer 1' to form electrode 5'. Each of device structures shown in FIGS. 3A and 3B insures that the electric field intensity is greatest adjacent the electrode 5 or 5' and provides for the control of the frequency of the coherent oscillations by varying the voltage applied across the electrodes to establish field sustaining point $X_S$ along an intermediate portion of the active semiconductor layer.

While the invention has been particularly shown and described with reference to a preferred embodiment thereof, it will be understood by those skilled in the art that various changes in form and details may be made therein without departing from the spirit and scope of the invention.

What is claimed is:

1. A solid state device comprising a specimen of multivalley semiconductor material having the innate property of being responsive to electric fields in excess of a critical intensity to nucleate a high electric field region and responsive to electric fields in excess of a sustaining intensity less than said critical intensity to propagate a high electric field region, and means for supporting current flow in said specimen and capable of establishing an electric field gradient within said specimen such that the electric field intensity along at least one portion of said specimen would be in excess of said critical intensity so as to nucleate a high electric field region, and the electric field intensity along another portion of said specimen would be below said sustaining intensity when a high electric field region has been nucleated; said supporting means including variable means for determining the length of said another portion.

2. A solid state device as defined in claim 1 wherein said semiconductor material is selected from the group consisting of n-type gallion arsenide, n-type indium phosphide, n-type cadmium telluride, n-type indium arsenide when pressured, and n-type zinc selenide.

3. A solid state device comprising a specimen of semiconductor material having the innate property of being responsive to electric fields in excess of a critical intensity to nucleate a high electric field region and responsive to electric fields in excess of a sustaining intensity less than said critical intensity to propagate a high electric field region, and electric field applying means including voltage means connected to first and second ohmic contacts attached to said specimen for establishing an electric field gradient within said specimen intermediate said ohmic contacts, said voltage means being capable of establishing the electric field intensity in said specimen adjacent one of said ohmic contacts in excess of said critical intensity so as to nucleate a high electric field region and of establishing the electric field intensity in said specimen adjacent the other of said ohmic contacts below said sustaining intensity while a high electric field region is propagating in said specimen, said voltage means being variable so as to control the propagation distance of said high field region along said specimen.

4. A solid state device as defined in claim 3 wherein said ohmic contacts are attached at a same surface of said specimen.

5. A solid state device as defined in claim 3 wherein said ohmic contacts are attached at a same surface of said specimen, said one contact having a dot geometry and said other contact having an annular geometry.

6. A solid state device as defined in claim 3 wherein said ohmic contacts are attached at a same surface of said specimen, said ohmic contacts having opposing edges of different lengths.

7. A solid state device as defined in claim 3 wherein said ohmic contacts are attached at a same surface of said specimen, said one contact having a dot geometry and said other contact being concentric with said one contact.

8. A solid state device comprising a specimen of semiconductor material of given conductivity type having a graded impurity profile extending between opposite surfaces, said semiconductor material having a multivalley conduction band and having the innate property of being responsive to electric fields in excess of a critical intensity to nucleate a high electric field region and responsive to electric fields in excess of a sustaining intensity less than said critical intensity to sustain and propagate a high electric field region along said specimen, and voltage means including ohmic contacts attached to said opposite surfaces of said specimen for establishing an electric field gradient within said specimen and between said ohmic contacts, said voltage means being of sufficient magnitude to nucleate and propagate successively high electric field regions along at least a portion of said specimen whereby current flow along said specimen fluctuates periodically in the form of coherent oscillations, said voltage means being variable so as to control the propagation distance of said high electric field regions along said specimen whereby the frequency of said coherent oscillations is varied.

9. A solid state device as defined in claim 8 wherein at least one of said ohmic contacts is defined by an epitaxial layer of semiconductor material of said given conductivity type.

10. A solid state device as defined in claim 8 wherein at least one of said ohmic contacts is alloyed to said specimen.

11. A solid state device comprising a thin layer of semiconductor material of given conductivity type having a multivalley conduction band and having the innate property of being responsive to electric fields in excess of a critical intensity to nucleate a high electric field region and responsive to electric fields in excess of a sustaining intensity less than said critical intensity to propagate a high electric field region along said specimen, ohmic contacts formed on one surface of said thin layer and having opposing edges of different lengths, and voltage means connected to said ohmic contacts to establish an electric field gradient along said thin layer intermediate said ohmic contacts, said voltage means being of sufficient magnitude to nucleate and propagate successively high electric field regions along at least a portion of said thin layer intermediate said ohmic contacts whereby current flow along said thin layer fluctuates periodically in the form of coherent oscillations, said voltage means being variable so as to control the propagation distance of said high electric field regions along said thin layer intermediate said ohmic contacts whereby the frequency of said coherent oscillations is varied.

12. A solid state device as defined in claim 11 wherein at least one of said ohmic contacts is defined by an epitaxial layer of semiconductor material of said given conductivity type.

13. A solid state device as defined in claim 11 wherein at least one of said ohmic contacts is an alloyed contact.

14. A solid state device as defined in claim 11 wherein one of said ohmic contacts is formed in a dot geometry and the other of said ohmic contacts is formed in an annular geometry.

15. A solid state device as defined in claim 11 wherein said thin layer is supported on a substrate formed of semi-insulating material.

16. A solid state device as defined in claim 11 wherein said thin layer is supported on a substrate formed of semiconductor material of opposite conductivity type.

No references cited.

ROY LAKE, *Primary Examiner.*

S. H. GRIMM, *Assistant Examiner.*